United States Patent Office 3,435,035
Patented Mar. 25, 1969

3,435,035
PYRIMIDINE SULFONES
Ernst Habicht and Ruggero Zubiani, Schaffhausen, Switzerland, assignors to Cilag-Chemie Limited, a Swiss company of Schaffhausen, Switzerland
No Drawing. Filed Feb. 10, 1964, Ser. No. 343,512
Int. Cl. C07d *51/42, 51/34;* A61k *27/00*
U.S. Cl. 260—251                             3 Claims The present invention relates to new heterocyclic sulfones; more specifically the invention relates to pyrimidine sulfones of the general formula

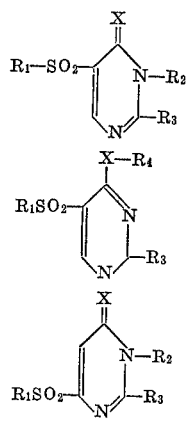

respectively, wherein $R_1$ represents a lower alkyl radical or an optionally substituted phenyl radical, $R_2$ means hydrogen, lower alkyl, lower hydroxyalkyl or lower acyloxyalkyl and wherein $R_3$ stands for an alkyl, aralkyl, aryl, amino, alkylamino, dialkylamino, acylamino, mercapto, or an alkylmercapto radical and wherein X is oxygen or the —NH— group and $R_4$ hydrogen or lower alkyl.

By lower alkyl, hydroxyalkyl, acyloxyalkyl respectively should be understood: methyl, ethyl, propyl or butyl, hydroxymethyl, hydroxyethyl, hydroxypropyl, hydroxybutyl, etc. acetoxymethyl, propionyloxymethyl, butyroyloxymethyl, acetoxyethyl, propionyloxyethyl, butyroyloxyethyl, acetoxypropyl, propionyloxypropyl, butyroyloxypropyl, acetoxybutyl, propionyloxybutyl, butyroyloxybutyl, and by the optionally substituted aryl or aralkyl respectively should beside phenyl or phenylalkyl respectively be understood for instance chlorophenyl, dichlorophenyl, bromophenyl, fluorophenyl, iodophenyl or trifluoromethylphenyl, methylphenyl dimethylphenyl, alkoxyphenyl, particularly methoxyphenyl or dimethoxyphenyl or dimethoxyphenylalkyl respectively.

$R_3$ can either represent a lower alkyl radical such as methyl, ethyl, propyl or butyl, or a longer-chain alkyl radical as for instance nonyl, decyl, undecyl, dodecyl, terdecyl, tetradecyl, pentadecyl, hexadecyl. This radical can, for instance also be unsaturated as decenyl, undecenyl, dodecenyl, etc. In case $R_3$ represents a lower alkyl, particularly the methyl radical, this latter can also be halogeno-substituted, thus resulting in a trifluoromethyl or trichloromethyl group.

The above defined heterocyclic sulfones have microbicidal activity. In particular they have germicidal activity against trichomonas, against fungi as well as against gram-negative and gram-positive germs.

Furthermore the new pyrimidine sulfones exhibit diuretic and vasodilating activity. Depending on the structure, these pyrimidine sulfones can be used as diuretics, germicides or as medicines in coronary disturbances.

The new heterocyclic sulfones of the Formula I or Ib respectively can principally be prepared following the same uniform process.

The compounds of Formula I or Ib respectively are prepared dependant on the constitution of the group X (X=O or NH) by reaction of a R-oxymethylene compound of the formula

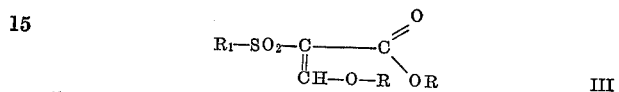

(in the case of X=O) or a compound of formula

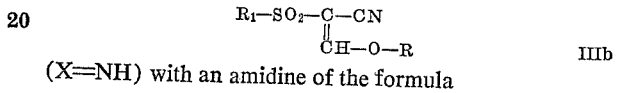

(X=NH) with an amidine of the formula

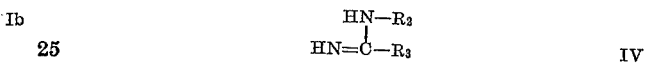

As a rule, the condensation is carried out in the presence of bases, particularly alkalialcoholates.

In the Formulae II and IIIb respectively R means an organic radical, preferably an alkyl radical. R can also mean acyl, for instance formyl or acetyl. Since these radicals are split off during the reaction process, their nature is of minor significance.

The R-oxymethylenesulfonyl acetic acid esters or the nitriles of Formula III or Formula IIIb respectively can be prepared by reacting sulfonyl acetic acid esters or sulfonyl acetic acid nitriles respectively with ortho-formic acid esters. For the condensation there is preferably worked in the presence of a condensation agent as for instance zinc chloride. Since the R-oxymethylenesulfonyl acetic acid esters or nitriles respectively represent new substances, their preparation is described in detail in the experimental part.

In the amidine of Formula IV $R_2$ can mean a hydrogen or also the organic radical defined for $R_2$.

In the first case it is possible, if desired, to introduce in 3-position into the obtained pyrimidine derivative of the Formula I or Ib respectively an alkyl radical, hydroxyalkyl radical or acyloxyalkyl radical $R_2$ respectively.

In principle, the organic radical $R_2$ is introduced into the pyrimidine nucleus by means of reactive esters of alcohols corresponding to $R_2$. Working is carried through preferably in the presence of alkaline condensation agents such as for instance sodiumhydroxide, potassiumhydroxide, sodiummethanolate or sodiumethanolate.

As reactive esters of alcohols of the formula $R_2OH$ are used the hydrohalide acid esters, the sulfuric acid esters or the organic sulfonic acid esters.

It is possible to introduce either a hydroxyalkyl radical or an acyloxyalkyl radical in a one or two step process. The hydroxyalkyl radical can for instance be introduced by way of acyloxyalkyl or benzyloxyalkyl. In the first case, the hydroxy group is freed by mild and particularly alkaline saponification, in the latter case by hydrogenolysis.

The hydroxyalkyl radical can also be introduced directly by means of a corresponding halogenohydrine or an epoxide or a cyclic carbonate in the presence of alkaline condensation agents.

A hydroxyalkyl radical introduced in the above mentioned manner can be transferred into an acyloxyalkyl radical by means of reactive derivatives of lower fatty acids. As reactive derivatives of fatty acids are considered for instance the halogenides or the anhydrides of acetic acid, propionic acid or butyric acid.

If X represents an oxygen atom, then this can be transformed into an alkoxy radical by way of a halogeno atom (Formula Ib: X=O, $R_4$=lower alkyl). The transformation of X into a halogeno atom can be carried out by means of chlorinating agents as for instance phosphoroxychloride, phosphortrichloride, phosphorpentachloride, pyrocatechinphosphoryltrichloride, etc.

Substitution of the halogeno atom by an alkoxy radical takes place by means of a corresponding alkanol in the presence of an alkalialcoholate.

In Formulae II or IIb respectively the radicals $R_1$, $R_2$ and $R_3$ have the same meaning as in Formulae I or Ib respectively. Also these compounds have microbicidal and particularly trichomonacidal activity.

In the above mentioned Formulae II and IIb $R_1$ represents, as afore-mentioned, among others a lower alkyl radical or an optionally substituted phenyl radical. $R_2$ can mean a hydrogen atom or a lower alkyl radical as for instance methyl, ethyl, propyl, isopropyl, butyl, isobutyl, secondary butyl, tertiary butyl, or hydroxyalkyl such as hydroxyethyl, hydroxypropyl, hydroxbutyl: $R_2$ can likewise represent an acyloxyalkyl radical as for instance acetoxyethyl, acetoxypropyl, acetoxybutyl, propionyloxyethyl, propionyloxypropyl, propionyloxybutyl, butyroyloxyethyl, butyroyloxypropyl, butyroyloxybutyl, etc.

As already discussed, $R_3$ can for instance represent an alkyl radical, an halogenoalkyl radical or the amino group or an alkylamino, dialkylamino or acylamino radical respectively.

In particular $R_3$ can mean: methyl, ethyl, n-propyl, isopropyl, tertiary butyl, trifluoromethyl, or longer alkyl radicals as for instance octyl, nonyl, decyl, dodecyl, undecyl, terdecyl, tetradecyl, hexadecyl, pentadecyl or amino, methylamino, dimethylamino, monoethylamino, diethylamino, propylamino, dipropylamino, butylamino, dibutylamino or mercapto and alkylmercapto respectively, such as methylmercapto, ethylmercapto, propylmercapto, butylmercapto, or acylamino such as acetylamino, formylamino, propionylamino or butyroylamino.

The new sulfones of Formulae II and IIb respectively can be prepared in simple manner, for instance by reacting a pyrimidine of the formula

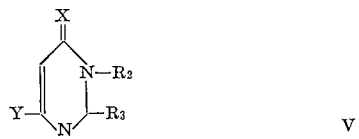

V wherein Y means a halogeno atom, with a mercaptan of the formula $R_1SH$ or an alkalimercaptan thereof respectively with subsequent oxidation of the formed $R_1$-mercaptopyrimidine or by reaction of a halogenide of the Formula V with a salt, preferably an alkali salt of a sulfinic acid of the formula $$R_1SO_2H \qquad IV$$

Oxidation of a $R_1$-mercaptopyrimidine into a corresponding sulfone can for instance be performed by means of hydrogen peroxide in acetic solution or in peracetic acid respectively, but also by means of $KMnO_4$ in acetonic solution, etc.

The formed pyrimidines (X=O) of the Formula I or II respectively represent, as a rule, only substances which react slightly acid. The pyrimidines crystallize well and can, therefore, immediately be obtained in the free form. In case X=oxygen and $R_4$=alkyl, these substances show rather neutral reaction. In this case they can either be obtained by distillation or crystallization.

Example 1

(a) 60.8 g. ethyl α-methylsulfonylacetate and 148 g. of ethyl ortho-formate and 150 cc. of acetic acid anhydride are heated in a 1 liter 4-necked flask equipped with distillation tube while turbinating. There is heated until the internal temperature reaches approximately 130° C. The distillate separating in the distillation tube is every time put back into the reaction flask. After two hours the distillate is not any more put back, but collected separately. Heating for five hours is followed by distillation of the reaction mixture in the high vacuum. There is obtained a forerun of approximately 10 g., boiling under 0.2 mm. at 35–111° C., then a main fraction of 63 g., boiling under 0.15 mm. at 111–133° C. The main fraction is then redistilled over a column, whereby there are obtained as main fraction 10.9 g. of a liquid boiling under 0.01 mm. at 102° C. This liquid represents the ethyl α-ethoxymethylene-α-methylsulfonylacetate. The yield is 10.9 g. corresponding to 13.4% of the theoretical value and 62% turnover, considering the recovered α-methylsulfonylacetic acid ester. With a ten-fold batch, the yield slightly increases up to 20% of the theoretical value and the turnover to 70% of the theoretical value.

(b) In a stirring flask equipped with a dropping funnel and reflux condenser are placed 15.2 g. of acetamidine-hydrochloride, 68.5 g. of 12.7% sodiummethanolate solution and 50 cc. of absolute ethanol. 35.8 g. of the ester obtained according to (a) are added dropwise under vigorous turbinating and subsequently the whole is heated to boiling and turbinated for two hours at boiling temperature. After cooling there is added acetic acid up to a pH range of 5 and evaporated in the vacuum. The residue is dissolved in hot condition in water and treated with charcoal, filtered and the solution left to stand.

There are thus obtained 10 g. of 2-methyl-4-hydroxy-5-methylsulfonylpyrimidine or [2-methyl-5-methylsulfonyl-pyrimidone-(4)] repectively, melting under decomposition at 222–224° C.

Methylation with dimethylsulfate in the presence of sodium-methanolate results in the 2,3-dimethyl compound which melts at 132–133° C. The 2,3-dimethyl compound can also be prepared by means of methyliodide in the presence of Na-methanolate. Recrystallization is preferably carried out from 95–96% ethanol. The compound dissolves easily in water and chloroform, little in ether and petroleum ether.

When reacting 2-methyl-4-hydroxy-5-methylsulfonylpyrimidine with ethylenebromohydrin, then the 2-methyl-3 - hydroxyethyl - 4 - hydroxy - 5 - methylsulfonyl - pyrimidine is obtained in a good yield. Instead of ethylenebromohydrin also β-bromoethylacetate can be used for the alkylation. Thereby is obtained the acetic acid ester of the 3-hydroxyethyl compound. This latter can, if desired, be saponified to the corresponding hydroxyethyl compound in alkaline solution.

Example 2

By reacting 11.75 g. of ethyl α-ethoxymethylene-α-methylsulfonylacetate with 5.75 g. of priopionamidine-hydrochloride in the presence of 22.55 g. of sodium-methanolate (12.75%) in 15 cc. of ethanol as solvent, there are obtained 6 g. of 2-ethyl-5-methylsulfonyl-pyrimidone-(4) or 2-ethyl-5-methylsulfonyl-4-hydroxypyrimidine. The new compound melts after recrystallization from water at 195–196° C.

Example 3

To a solution of 2 g. of guanidine in 20 cc. of absolute ethanol there are added 10.1 g. of ethyl α-toluenesulfonyl-α-ethoxymethyleneacetate. The reaction starts under self-heating. After having been left to stand, the whole is adjusted to a pH value of 5 with 20 cc. of 2 N acetic acid and 50 cc. of water are added. A yellow oily separation takes place which soon changes into a crystal mass. The crystals are filtered off by suction and thoroughly washed with water, dried, rewashed with methylene chloride and the filter cake reprecipitated from sodium hydroxide/acetic acid. There are obtained 3.5 g. of 2-amino-4-hydroxy - 5 - p - toluenesulfonyl-pyrimidine, melting at 304–305° C. under decomposition. The new pyrimidine forms colorless crystals which are insoluble in ether, even little soluble in water when boiling, but readily soluble in dimethylformamide.

Example 4

150 cc. of a 2.04 N sodiummethanolate solution are placed in a stirring flask and to this solution are added 17.8 g. of N-2′-methylbutyl-guanidine sulfate. Under stirring, a solution of 22 g. of ethyl α-methylsulfonyl-α-ethoxymethyleneacetate in 20 cc. of methanol is added by drops. After two hours' stirring the whole is heated to boiling for a while and left to stand over night. Subsequently there is acidified with acetic acid and the whole evaporated to dryness. Three times recrystallization from absolute ethanol results in 8 g. of 2-(2′-methylbutylamino)-4-hydroxy-5-methylsulfonyl-pyrimidine, melting at 215–217° C.

Example 5

6.05 g. of guanidine (freed from guanidine nitrate by means of sodiummethanolate) are dissolved in 70 cc. of absolute ethanol and to this solution are added while stirring 29 g. of ethyl α-phenylsulfonyl-α-ethoxymethylene-acetate. The temperature rises spontaneously to approximately 40° C. There is stirred at this temperature for further two hours and then the solvent distilled off. The whole is adjusted to a pH value of 5, whereby beautiful crystals separate; then there is diluted with water and after three hours filtered by suction. There are thus obtained 14.2 g. of the crude product which melts at 265–268° C. After recrystallization from a 80:250 mixture of dimethylformamide/water there is obtained the pure 2-amino - 4 - hydroxy - 5-phenylsulfonyl-pyrimidine which melts at 292–294° C. This new compound is very little soluble in water, but comparatively well soluble in dimethylformamide and can be reprecipitated from NaOH/CH₃COOH

Example 6

9.65 g. of guanidine are dissolved in 100 cc. of absolute ethanol and to this solution are added 36.3 g. of ethyl α-methylsulfonyl-α-ethoxymethyleneacetate. The whole is vogorously stirred, whereby self-heating up to approximately 60° C. sets in. The whole is then left to stand and after approximately 24 hours the formed crystals are filtered off by suction, then washed with water and dried, whereby 17 g. of the 2-amino-4-hydroxy-5-methylsulfonyl-pyrimidine result which melts at 319°–321° C. under decomposition.

Example 7

9.5 g. of the pyrimidine obtained according to the above example are heated to reflux for two hours in 50 cc. of glacial acetic acid with 5.1 g. of acetic acid anhydride. After one hour 100 cc. of pyridine are added, then the whole is cooled and the precipitated crystals filtered off by suction, washed with glacial acetic acid and ether. After recrystallization from dimethylformamide there are obtained 5.2 g. of the 2-acetylamino-4-hydroxy-5-methylsulfonyl-pyrimidine, melting at 293–296° C. The new compound forms colorless, well shaped crystals.

Example 8

4.5 g. of acetamidine-hydrochloride are given into 10 cc. of absolute ethanol, and to this mixture are added 23.5 cc. of a 2.04 N sodiummethanolate solution. While vigorously stirring, a solution of 13.5 g. of ethyl α-phenyl-sulfonyl-α-ethoxymethyleneacetate in 20 cc. of absolute ethanol is added by drops. The reaction starts under self-heating and is terminated by two hours' heating. After cooling the whole is adjusted to a pH value of 4 by means of 2 N acetic acid and left to stand for some time. The precipitating crystals are filtered off by suction, recrystallized from diluted methanol and dried. There are thus obtained 4.2 g. of the 2-methyl-4-hydroxy-5-phenylsulfonyl-pyrimidine, melting at 234–236° C. This new pyrimidine can easily be recrystallized from water.

Example 9

(a) 13.45 g. of N-benzyloxyethyl-acetamidine are hydrogenated in 100 cc. of absolute ethanol in the presence of 3 g. of 5% Pd/charcoal catalyst under slight overpressure. In order to accelerate the absorption of hydrogen, the whole is heated to 60° C. After absorption of the calculated quantity of hydrogen the catalyst is filtered off by suction, the filtrate filtered with little celite and the alcohol distilled off in the vacuum under nitrogen atmosphere at max 50° C. As residue remain 4.7 g. of a yellow-greenish, rather thick oil. This is not further purified, but processed straight away.

(b) The N-hydroxyethyl-acetamidine obtained according to (a) is dissolved in 50 cc. of absolute ethanol. To this solution are added 10.35 g. of ethyl α-methylsulfonyl-α-ethoxymethylene-acetate. The reaction takes place under slight entropy. The whole is then left to stand for one day and the formed crystals are filtered off by suction. After recrystallization from ethanol there are obtained 4 g. of the 2-methyl-3-hydroxyethyl-5-methanesulfonyl-pyrimidone-(4); the new pyrimidone dissolves only little in ether.

Example 10

From 9 g. of N,N-dimethylguanidine-sulfate there is prepared in 40 cc. of absolute ethanol by means of 17 cc. of 2,04 N sodiummethanolate solution the free base. To this base are added 7.5 g. of ethyl α-methylsulfonyl-α-ethoxymethylene-acetate in 30 cc. of absolute ethanol. Short-time heating is followed by cooling, then the ethanol is distilled off and the residue adjusted to a pH value of 5. The precipitated crystals are recrystallized from methanol. There are obtained 3 g. of the 2-dimethylamino-4-hydroxy-5-methanesulfonyl-pyrimidine, melting at 263–266° C. The new pyrimidine can be recrystallized from hot water. It is practically insoluble in chloroform, benzene, acetone, ethylacetate and dioxane; in dimethylformamide it is soluble even in cold condition.

Example 11

12 g. of benzamidine are dissolved in 100 cc. of ethanol. To this solution are added 22.2 g. of ethyl α-methylsulfonyl-α-ethoxymethyleneacetate. The whole is left to stand for one day, subsequently the alcohol is distilled off in the vacuum. The residue forms slightly yellowish, smeary crystals. After recrystallization from diluted dimethylformamide there are obtained 7 g. of the 2-phenyl-4-hydroxy-5-methanesulfonyl-pyrimidine which melts at 282–284° C. Recrystallization can also be performed from a mixture of ethanol/acetone. The new pyrimidine is very little soluble in hot water, comparatively little soluble in hot ethanol and acetone and practically insoluble in ether and petroleum ether. The new pyrimidine can be reprecipitated from diluted sodium hydroxide solution/diluted HCl.

Example 12

From 5.75 g. of propionamidine-hydrochloride there is freed the base by means of sodiummethanolate. This base is dissolved in 15 cc. of obsolute ether and the solution treated with 11.75 g. of ethyl α-methylsulfonyl-α-ethoxymethylene-acetate. The whole is heated to boiling for a short time, cooled and subsequently adjusted to a pH value of 5 by means of diluted acetic acid. The whole is evaporated to dryness in the vacuum and the residue recrystallized from water. There are thus obtained 4.3 g. of 2-ethyl-4-hydroxy-5-methylsulfonyl-pyrimidine, melting at 195–196° C. The new pyrimidine is soluble at a ratio of aproximately 2% in water of 20° C., little soluble in hot ethanol and moderately in hot chloroform.

Example 13

From 7.1 g. of lauramidine-hydrochloride there is freed the base by means of sodiummethanolate solution. To the freed base there are added 6.75 g. of ethyl methyl-sulfonyl-α-ethoxymethyleneacetate. The whole is heated to boiling for approx. three hours, cooled and then adjusted to a pH value of 5 to 6. Recrystallization from water results in 6.3 g. of 2-undecyl-4-hydroxy-5-methylsulfonyl-pyrimidine which melts at 173–174° C. The new pyrimidine can likewise be recrystallized from ethanol. It is practically insoluble in ether, diluted acetic acid and benzene and dissolves in dimethylformamide in cold condition. Precipitation from diluted NaOH/diluted HCl result also in a pure product.

Example 14

A solution of 7.6 g. of thiourea in 50 cc. of ethanol is treated with a solution of 22.2 g. of ethyl α-methylsulfonyl-α-ethoxymethyleneacetate. To this solution are added 18 g. of sodiummethanolate solution (11 g. of sodium in 100 cc. of methanol) and the whole is left to stand for the one day. Subsequent evaporation in the vacuum is followed by treating of the residue with diluted acetic acid. The precipitating substance is filtered off by suction and washed with water. After drying there are obtained 9.1 g. of the 2 - mercapto - 4-hydroxy - 5-methylsulfonylpyrimidine.

Example 15

(a) 16.6 g. of 2-methyl-4-hydroxy-5-methylsulfonyl-pyrimidine are heated while turbinating with 61 cc. of distilled phosphoroxychloride. After three hours the phosphoroxychloride is distilled off under further turbinating in the vacuum. The residue is treated with ice-water, concentrated ammonia and chloroform. The whole is then thoroughly shaken and the chloroform extract dried over sodiumcarbonate for a short time. The solvent is distilled off under nitrogen atmosphere, then the residue is treated with benzene and again evaporated. The residue crystallizes after a short time, is then dissolved in benzene in hot condition, filtered with charcoal and cooled. After some time there are obtained 6.8 g. of the 2-methyl-4-chloro-5-methylsulfonyl-pyrimidine, melting at 113–114.5° C.

(b) 7.6 g. of 2-methyl-4-chloro-5-methylsulfonyl-pyrimidine are dissolved in 50 cc. of methanol and to this solution are added 18 cc. of a 2.04 N sodiummethylate solution. The whole is left to stand at room temperature, then heated quickly with methanolic HCl (pH=5) and again cooled. The formed sodium chloride is filtered off by suction and the filtrate evaporated. The residue is extracted with 125 cc. of methylene chloride and the filtrate again evaporated. After recrystallization from methanol there are obtained 5.2 g. of 2-methyl-4-methoxy-5-methylsulfonyl-pyrimidine which melts at 147–149° C. The new pyrimidine is little soluble in cold condition, moderately in hot condition in water, ethanol and acetone. The compound dissolves already in cold condition in methylene chloride, chloroform and dimethylformamide.

In similar manner, as described in the examples, there can further be prepared:

5-methylsulfonyl-4-hydroxy-3-methyl-2-trifluoromethylpyrimidine
5-methylsulfonyl-4-hydroxy-3-ethyl-2-methylpyrimidine
5-methylsulfonyl-4-hydroxy-3-ethyl-2-trifluoromethylpyrimidine
5-methylsulfonyl-4-hydroxy-3-hydroxyethyl-2-methylpyrimidine
5-methylsulfonyl-4-hydroxy-3-isopropyl-2-methylpyrimidine
5-methylsulfonyl-4-hydroxy-3-isopropyl-2-methylpyrimidine
5-methylsulfonyl-4-hydroxy-3-hydroxybutyl-2-trifluoromethylpyrimidine
5-methylsulfonyl-4-hydroxy-3-butyl-2-trifluoromethylpyrimidine
5-methylsulfonyl-4-hydroxy-3-acetoxyethyl-2-methylpyrimidine
5-methylsulfonyl-4-hydroxy-3-acetoxyethyl-2-trifluoromethylpyrimidine
5-methylsulfonyl-4-hydroxy-3-hydroxyethyl-2-isopropylpyrimidine
5-methylsulfonyl-4-hydroxy-3-methyl-2-isopropyl-pyrimidine
5-methylsulfonyl-4-hydroxy-3-methyl-2-tert.butyl-pyrimidine
5-ethylsulfonyl-2-propyl-4-hydroxy-pyrimidine.

Example 16

(a) 25 g. of 2-methyl-4,6-dichloropyrimidine are heated to reflux for 45 minutes while stirring with 100 cc. of concentrated hydrochloric acid and 250 cc. of water. After approximately 5 minutes already a clear solution results. After cooling, the whole is rendered alkaline with concentrated ammonia, filtered and acidified to a pH value of 4 to 5 with glacial acetic acid. After having been left to stand over night, the formed crystals are filtered off by suction. After drying there are obtained 15 g. of 2-methyl-4-hydroxy-6-chloro-pyrimidine, melting at 227–228° C. (cf. J. Chem. Soc. 1946, p. 717). After three times recrystallization from ethanol there is obtained the pure compound which melts at 233° C. The compound need not be particularly purified for further processing.

(b) 15 g. of 2-methyl-4-hydroxy-6-chloro-pyrimidine are heated in the autoclave for one hour to 100° C. with 100 cc. of an alcoholic solution which contains 4.3 g. of sodium and 8.5 g. of methylmercaptane. After cooling, the whole is acidified with diluted acetic acid to a pH value of 4, the batch is evaporated to dryness and dried over $P_2O_5$. Subsequently there is thoroughly extracted with benzene, the benzene solution dried and evaporated. The residue yields after recrystallization from ethanol 12 g. of 2-methyl-4-hydroxy-6-methylthio-pyrimidine, melting at 222–224° C. (cf. J. Chem. Soc. 1955, p. 1859).

(c) 15.6 g. of the methylthiopyrimidine obtained according to (b) are suspended in 100 cc. of pure glacial acetic acid. To this solution are added under stirring and occasional cooling to 17–22° C. 32.2 cc. of peracetic acid (49.7%) in glacial acetic acid. After approximately 5 minutes a clear solution results. The whole is left to stand for 20 hours at room temperature, then treated with 500 cc. of ether, stirred for 30 minutes and the precipitating substance filtered off by suction. There are obtained 16.4 g. of yellow crystals, melting at 215–216° C. After recrystallization from water, the melting point does not change. The new 2-methyl-4-hydroxy-6-methylsulfonylpyrimidine (2-methyl-6-sulfonyl-4-pyrimidone respectively) is very well soluble in hot water, moderately in cold water, dissolves well in hot ethanol and less in cold ethanol and is very well soluble in 2 N sodiumhydroxide solution.

(d) 18.8 g. of the pyrimidine obtained according to (c) are added to a solution of 2.3 g. of sodium in 50 cc. of ethanol and the whole is treated with 15.6 g. of methyliodide. Then it is heated to boiling for 3 hours and subsequently evaporated to dryness. The residue is recrystallized from absolute ethanol and results in 14 g. of the 2,3-dimethyl-6-methylsulfonyl-4-pyrimidone, melting at 151–152° C. The new pyrimidine compound is very readily soluble in cold acetone, chloroform, hot ethanol, ethylacetate and benzene; it is readily soluble in hot water, little soluble in cold ethanol and benzene and very little soluble in cold and warm ether.

Example 17

2.3 g. of sodium are dissolved in 50 cc. of methanol. To this solution are added 18.8 g. of 2-methyl-4-hydroxy-6-methyl-sulfonyl-pyrimidine and subsequently 15.6 g. of methyliodide. The whole is heated to reflux for several hours and then evaporated to dryness. The residue is recrystallized from absolute ethanol and results in 12.6 g. of the 2,3-dimethyl-4-oxo-6-methylsulfonyl-pyrimidine, melting at 151–152° C. The new pyrimidine is readily soluble in cold acetone, chloroform, hot water, ethyl acetate and benzene, but little soluble in benzene in cold condition and in hot ether.

Example 18

28.9 g. of 2-methyl-4-methoxy-6-chloro-pyrimidine are dissolved in 100 cc. of ethyleneglycol-mono-methylether and to this solution are added 29.8 g. of sodium benzenesulfinate. The whole is heated to reflux for 7 hours, then cooled and treated with 300 cc. of water, whereby a sediment precipitates. After recrystallization from diluted ethanol there are obtained 17.5 g. of the 2-methyl-4-methoxy-6-phenylsulfonyl-pyrimidine which melts at 134–136° C. The new pyrimidine is very easily soluble in cold acetone, chloroform, ethylacetate and benzene, easily soluble in ether and practically insoluble in cold and hot water.

In analogous manner, as described in the foregoing examples, there can furthermore be prepared:

6-methylsulfonyl-2-methyl-3-ethyl-4-pyrimidone
6-methylsulfonyl-2-methyl-3-propyl-4-pyrimidone
6-methylsulfonyl-2-methyl-3-isopropyl-4-pyrimidone
6-ethylsulfonyl-2-methyl-3-ethyl-4-pyrimidone
6-ethylsulfonyl-2,3-dimethyl-4-pyrimidone
6-methylsulfonyl 2,3-diethyl-4-pyrimidone
6- methylsulfonyl-2-trifluoromethyl-3-methyl-4-pyrimidone
6-methylsulfonyl-2-trifluoromethyl-3-ethyl-4-pyrimidone
6 - methylsulfonyl - 2-trifluoromethyl-3-n-propyl-4-pyrimidone etc.

Example 19

11.9 g. of methylsulfonyl-acetonitrile are heated with 29.6 g. of formic acid-o-ethylester and 40.8 g. of acetic acid anhydride for 2½ hours in the oil-bath at 135–140° C. The formed ethyl acetate is distilled off on the descending cooler and the residue, weighing 17.5 g., is fractionated in the high vacuum. The fraction boiling under 0.007 mm. at 130–131° C. is collected; it weighs 16.3 g. and represents the desired α-methylsulfonyl-α-ethoxymethylene-acetonitrile.

Example 20

8.75 g. of acetamidine-hydrochloride are suspended in 40 cc. of absolute ethanol and to this suspension are added 46 cc. of a 204 N sodiummethanolate solution. Subsequently there is added a solution of 16.2 g. of α-methylsulfonyl-α-ethoxymethylene-acetonitrile in 20 cc. of ethanol. The reaction takes place under self-heating to approximately 50° C. The whole is turbinated for approximately two hours at a bath temperature of 60–65° C. and left to cool down. The precipitating crystals are filtered off by suction and then extracted with ether. The combined ethereal solutions are evaporated, concentrated to a volume of 220 cc. and then left to cool. There are obtained 13 g. of the 2-methyl-4-amino-5-methylsulfonyl-pyrimidine, melting at 179.5–181° C. The compound can be recrystallized from ethylacetate.

Example 21

19.1 g. of guanidine-hydrochloride are suspended in 200 cc. of absolute ethanol and to this suspension are added 93 cc. of 215 N sodiummethanolate solution. Notwithstanding the precipitating sodiumchloride, a further solution of 35 g. of α-methylsulfonyl-α-ethoxymethylene-acetonitrile in 30 cc. of absolute ethanol is added. The whole is stirred vigorously, whereby the reaction sets in spontaneously under self-heating. The whole is heated to boiling under vigorous stirring for one hour and then the solvent is evaporated. The residue is repeatedly extracted with ether, the ethereal solution filtered and then concentrated to half the volume. After cooling, the formed crystals are filtered off by suction and the whole recrystallized twice from absolute ethanol/absolute ether. There are thus obtained 15 g. of the 2,4-diamino-5-methylsulfonyl-pyrimidine, melting at 162–166° C.

Example 22

8.1 g. of N-2-methylbutylguanidine-sulfate are suspend in 30 cc. of absolute ethanol. To this suspension there are added 21.1 g. of 215 N sodiummethanolate solution and the whole is stirred vigorously. Then, a solution of 7.95 g. of α-methylsulfonyl-α-ethoxymethylene-acetonitirile in 20 cc. of absolute ethanol is added. The whole is heated to reflux for 1½ hours under vigorous stirring and then cooled. Subsequently the whole is treated with 250 cc. of water, whereby crystallization sets in immediately. After recrystallization from diluted ethanol there are obtained 5.1 g. of the 2-(2'-methylbutylamino)-4-amino-5-methylsulfonyl-pyrimidine, melting at 114–118° C. The new pyrimidine dissolves easily in methylene chloride and acetic acid, little in cold and hot water.

What we claim is:

1. A compound selected from the group consisting of

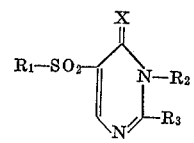

I

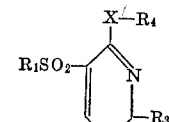

Ib

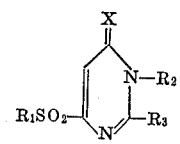

II and

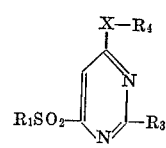

IIb wherein $R_1$ is selected from the group consisting of lower alkyl, phenyl and methylphenyl, $R_2$ is selected from hydrogen, lower alkyl, lower hydroxyalkyl, lower alkanoyloxyalkyl, $R_3$ is selected from the group consisting of alkyl, phenyl-lower alkyl, phenyl, amino, lower alkylamino, di-lower alkylamino, lower alkanoylamino mercapto, lower alkylmercapto and trifluoromethyl, X is a member selected from the group consisting of oxygen and —NH— and $R_4$ is selected from the group consisting of hydrogen and lower alkyl.

2. A compound of the formula

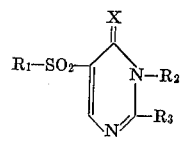

I wherein $R_1$ is a member of the group selected from lower alkyl and phenyl, $R_2$ is selected from the group consisting of hydrogen, lower alkyl, lower hydroxyalkyl and lower alkanoyloxyalkyl, $R_3$ is a member selected from the group consisting of lower alkyl, phenyl-lower alkyl, phenyl, amino, lower alkylamino, di-lower alkylamino, lower alkanoylamino, mercapto, lower alkylmercapto and trifluoromethyl, X is a member selected from the group consisting of oxygen and the NH-group and $R_4$ is selected from the group consisting of hydrogen and lower alkyl.

3. A compound of the formula

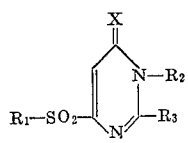

wherein $R_1$ is a member of the group selected from lower alkyl and phenyl, $R_2$ is a member of the group consisting of hydrogen, lower alkyl, lower hydroxyalkyl and lower alkanoyloxyalkyl, $R_3$ is a member selected from the group consisting of lower alkyl, phenyl, lower alkyl, phenyl amino, lower alkylamino, di-lower alkylamino, lower alkanoylamino, mercapto, lower alkylmercapto and trifluoromethyl, X is a member selected from the group consisting of oxygen and the —NH— group and $R_4$ is selected from the group consisting of hydrogen and lower alkyl.

References Cited

UNITED STATES PATENTS 3,127,398  3/1964  Bretschneider et al. ___ 260—251

ALEX MAZEL, *Primary Examiner.*

R. V. RUSH, *Assistant Examiner.*

U.S. Cl. X.R.

260—256.5, 999

UNITED STATES PATENT OFFICE
CERTIFICATE OF CORRECTION

Patent No. 3,435,035

March 25, 1969

Ernst Habicht et al.

It is certified that error appears in the above identified patent and that said Letters Patent are hereby corrected as shown below:

Column 2, line 28, "Formulae II" should read -- Formulae III --. Column 3, Formula V should appear as shown below:

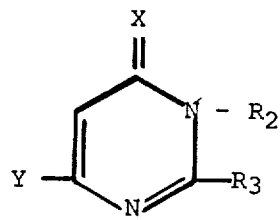

Column 6, line 27, "2,04" should read -- 2.04 --. Column 8, line 49, "sulfonyl" should read -- methylsulfonyl --. Column 9, line 45, "204" should read -- 2.04 --; line 62, "215" should read -- 2.15 --. Column 10, line 5, "215" should read -- 2.15 --.

Signed and sealed this 7th day of April 1970.

(SEAL)
Attest:

EDWARD M. FLETCHER, JR.
Attesting Officer

WILLIAM E. SCHUYLER, JR.
Commissioner of Patents